(12) United States Patent
Zhang et al.

(10) Patent No.: US 11,881,764 B2
(45) Date of Patent: Jan. 23, 2024

(54) SHORT-CIRCUIT PROTECTION SYSTEMS AND METHODS FOR FLYING CAPACITOR BASED BUCK-BOOST CONVERTERS

(71) Applicant: General Electric Company, Schenectady, NY (US)

(72) Inventors: Zheyu Zhang, Clifton Park, NY (US); Kenneth McClellan Rush, Ballston Spa, NY (US); Luca Tonini, Glenville, NY (US); Hao Tu, Raleigh, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/622,150

(22) PCT Filed: Aug. 13, 2019

(86) PCT No.: PCT/US2019/046325
§ 371 (c)(1),
(2) Date: Dec. 22, 2021

(87) PCT Pub. No.: WO2020/263288
PCT Pub. Date: Dec. 30, 2020

(65) Prior Publication Data
US 2022/0247306 A1    Aug. 4, 2022

Related U.S. Application Data

(60) Provisional application No. 62/865,790, filed on Jun. 24, 2019.

(51) Int. Cl.
*H02M 1/32* (2007.01)
*H02M 1/00* (2006.01)
*H02M 3/158* (2006.01)

(52) U.S. Cl.
CPC ......... *H02M 1/322* (2021.05); *H02M 1/0095* (2021.05); *H02M 3/1582* (2013.01)

(58) Field of Classification Search
CPC ........ H02M 1/322; H02M 1/325; H02M 1/32; H02M 1/10; H02M 1/0095; H02M 3/1582;
(Continued)

(56) References Cited

U.S. PATENT DOCUMENTS 9,136,695 B2    9/2015  Takizawa
9,484,799 B2    11/2016 Zhang et al.
(Continued)

FOREIGN PATENT DOCUMENTS

CN    105207459 A    12/2015
EP    3468026 A1     4/2019
(Continued)

OTHER PUBLICATIONS

International Search Report and Written Opinion for International Application No. PCT/US2019/046325, dated Mar. 25, 2020, 15 pages.
(Continued)

*Primary Examiner* — Nguyen Tran
(74) *Attorney, Agent, or Firm* — Armstrong Teasdale LLP (57) ABSTRACT

A multilevel converter system is provided. The multilevel converter system includes a multilevel converter and a short-circuit protection circuit. The multilevel converter includes a first segment and a second segment electrically connected to the first segment, wherein the first and second segments are each configured to convert a first current to a second current. The first segment includes a plurality of first switches. The second segment includes a plurality of second switches. The short-circuit protection circuit is electrically connected to the multilevel converter, wherein the short-
(Continued)

circuit protection circuit includes at least one electrical component that is electrically connected in parallel with at least one of the plurality of first switches and the plurality of second switches. The short-circuit protection circuit is configured to protect the plurality of first switches and the plurality of second switches from a short-circuit current during a short-circuit condition.

17 Claims, 7 Drawing Sheets

(58) Field of Classification Search
CPC .. H02M 3/1584; H02M 3/1586; H02M 3/158; H02M 3/156
See application file for complete search history.

(56) References Cited

U.S. PATENT DOCUMENTS

| | | | |
|---|---|---|---|
| 10,027,223 | B1 | 7/2018 | Zhang et al. |
| 10,153,706 | B2 | 12/2018 | Ying et al. |
| 2013/0343103 | A1* | 12/2013 | Takizawa ............... H02M 1/32 |
| | | | 363/53 |
| 2015/0249403 | A1* | 9/2015 | Sato .................... H02M 7/4837 |
| | | | 363/127 |
| 2017/0047863 | A1* | 2/2017 | Kidera ................... H02M 1/12 |
| 2018/0152097 | A1 | 5/2018 | Ying et al. |
| 2021/0083585 | A1* | 3/2021 | Jiang .................. H02M 7/4837 |

FOREIGN PATENT DOCUMENTS

| | | |
|---|---|---|
| JP | 6142751 B2 | 6/2017 |
| WO | 2008067786 A1 | 6/2008 |
| WO | 2017064848 A1 | 4/2017 |

OTHER PUBLICATIONS

Jasirah et al., "Protection Schemes for Various Fault Conditions of Three Level Dc-Dc Converters", International Journal of Innovative Research in Science, Engineering and Technology, Apr. 2014, vol. 3, Issue 4, pp. 11841-11849.

Sandra et al., "Detection of fault and implementation of resistor based protection scheme by controlling the flying capacitor voltage in a three-level DC-DC converter", 2014 International Conference on Green Computing Communication and Electrical Engineering (ICGCCEE), Conference Location: Coimbatore, India, 2014.

* cited by examiner (Prior Art)
FIG. 1

SHORT-CIRCUIT PROTECTION SYSTEMS AND METHODS FOR FLYING CAPACITOR BASED BUCK-BOOST CONVERTERS

CROSS REFERENCE TO RELATED APPLICATIONS

This application is a National Stage Entry of PCT/US2019/046325 filed on Aug. 13, 2019, which claims priority to and benefits of U.S. Provisional Patent Application No. 62/865,790 filed Jun. 24, 2019, the entire contents and disclosures of which are hereby incorporated by reference herein in their entirety.

BACKGROUND

The field of the disclosure relates generally to short-circuit protection, and more particularly, to a short-circuit protection system for a multilevel converter that introduces a small or no energy loss during normal operation of the converter.

Industry has begun to demand high power equipment, which may reach the megawatt level or even higher. In such equipment, multilevel converters enable working with high voltages. Multilevel converters typically include an array of power semiconductors and capacitor voltage sources. The commutation of switches formed from power semiconductors permits adding capacitor voltages, and enables reaching high output voltages. At times, short-circuit conditions may occur and cause damage to the converter.

BRIEF DESCRIPTION

In one aspect, a multilevel converter system is provided. The multilevel converter system includes a multilevel converter and a short-circuit protection circuit. The multilevel converter includes a first segment and a second segment electrically connected to the first segment, wherein the first and second segments are each configured to convert a first current to a second current. The first segment includes a plurality of first switches. The second segment includes a plurality of second switches. The short-circuit protection circuit is electrically connected to the multilevel converter, wherein the short-circuit protection circuit includes at least one electrical component that is electrically connected in parallel with at least one of the plurality of first switches and the plurality of second switches. The short-circuit protection circuit is configured to protect the plurality of first switches and the plurality of second switches from a short-circuit current during a short-circuit condition.

In another aspect, a short-circuit protection circuit for a multilevel converter is provided. The multilevel converter includes a first segment and a second segment electrically connected to the first segment, wherein the first and second segments are each configured to convert a first current to a second current. The first segment includes a plurality of first switches. The second segment includes a plurality of second switches. The short-circuit protection circuit includes at least one electrical component electrically connected in parallel with at least one of the plurality of first switches and the plurality of second switches of the multilevel converter. The short-circuit protection circuit is configured to protect the plurality of first switches and the plurality of second switches from a short-circuit current during a short-circuit condition.

In yet another aspect, a multilevel converter system is provided. The multilevel converter system includes a multilevel converter and a short-circuit protection circuit. The multilevel converter includes a first segment and a second segment electrically connected to the first segment, wherein the first and second segments are each configured to convert a first current to a second current. The first segment includes a plurality of first switches. The second segment includes a plurality of second switches. The multilevel converter further includes a bus capacitor and a flying capacitor. The bus capacitor is electrically connected in parallel with the plurality of first switches and the plurality of second switches. The flying capacitor is electrically connected in series with the plurality of first switches and in parallel with the plurality of second switches. The short-circuit protection circuit is electrically connected to the multilevel converter, wherein the short-circuit protection circuit includes at least one electrical component that is electrically connected in parallel with at least one of the plurality of first switches and the plurality of second switches. The short-circuit protection circuit is configured to protect the plurality of first switches and the plurality of second switches from a short-circuit current during a short-circuit condition.

DETAILED DESCRIPTION

Exemplary embodiments of systems and methods for short-circuit protection of a multilevel converter using a short-circuit protection circuit that has relatively low impact to normal operation of the converter are described herein. The short-circuit protection circuits disclosed herein are not in series with the bus terminal, such that they bypass the short-circuit current during short-circuit conditions (e.g. the circuit shown in FIG. 3), suppress the short-circuit current through converter switches by discharging capacitor energy (e.g. the circuit shown in FIG. 4), or eliminate a short circuit by isolating capacitor energy (e.g. the circuit shown in FIG. 6), and have little or no impact on operation of the converter. For example, the short-circuit protection circuit includes at least one electrical component that is electrically connected in parallel with at least one of a plurality of first switches and a plurality of second switches of the multilevel converter to protect the first and second switches from the short-circuit current, in the meantime to have little or no impact on the operation of the converter. In one embodiment, the at least one electrical component includes a plurality of diodes (see FIG. 3). In another embodiment, the at least one electrical component includes an auxiliary switch and a resistor (see FIG. 4). In yet another embodiment, the at least one electrical component includes first and second decoupling capacitors and first and second auxiliary switches (see FIG. 6).

Figure 1:
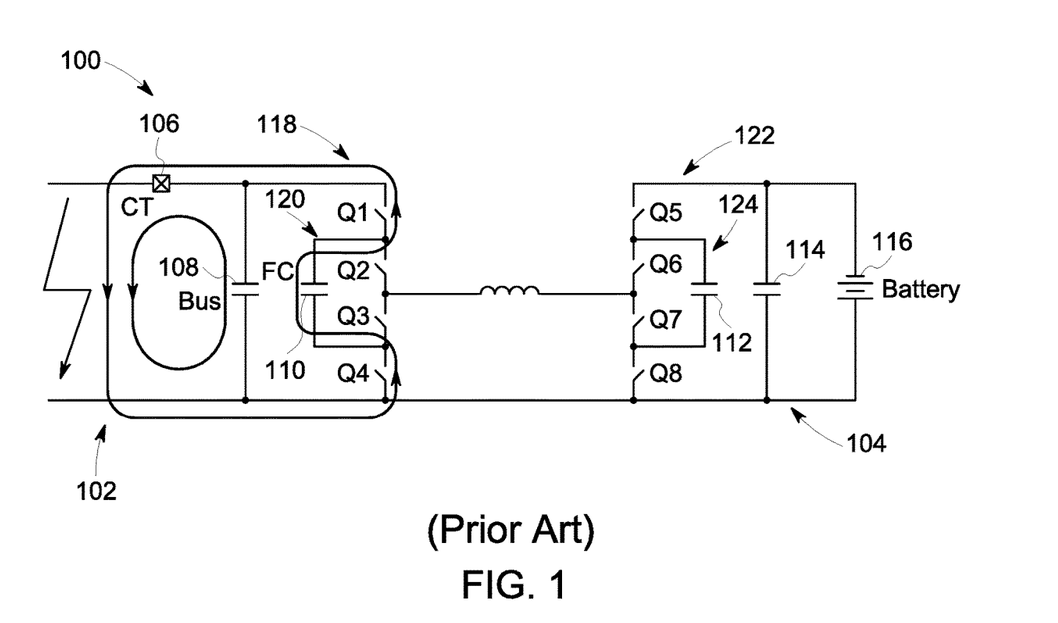
FIG. 1 is a schematic diagram of a known multilevel converter during a short-circuit condition.

FIG. 1 is a schematic diagram showing current paths during a short-circuit condition for an exemplary flying capacitor based buck-boost converter 100. Multilevel converter 100 may have multiple levels of voltage outputs. Buck-boost converter 100 shown in FIG. 1 is a three-level multilevel converter 100, which may have three levels of voltage outputs. Converter 100 includes a bus side 102 and a battery side 104. On bus side 102, the converter includes a current transducer (CT) 106, a bus capacitor 108, first switches Q1 and Q4, second switches Q2 and Q3, and a flying capacitor (FC) 110. On battery side 104, the converter includes first switches Q5 and Q8, second switches Q6 and Q7, capacitors 112, 114, and a battery 116. Converter 100 also includes segments. For example, converter 100 includes a first segment 118 and a second segment 120 on bus side 102. First segment 118 includes first switches Q1 and Q4. Second segment 120 includes second switches Q2 and Q3. On battery side 104, converter 100 includes first segment 122 and second segment 124. First segment 122 includes first switches Q5 and Q8. Second segment 124 includes second switches Q6 and Q7. To control the multilevel converter, a converter controller (not shown) generates pulse-width modulation (PWM) functions that are used to control the switches Q1-Q8.

At times, a short circuit occurs due to, for example, damage to insulation materials of devices receiving power from the bus. When a short circuit occurs, CT 106 detects the short-current condition and first and second switches Q1-Q8 on both bus side 102 and battery side 104 are turned off to limit damage caused by the short-current current. Switches Q1-Q8 may be turned off by the PWM functions generated by the converter controller. After being turned off, switches Q1-Q8, however, need to be protected from energy stored in capacitors 108, 110, 112, 114. For example, two short-circuit paths are formed on the bus side, as shown in FIG. 1. One is through CT 106, bus capacitor 108, and the load. The other is through CT 106, FC capacitor 110, and first switches Q1 and Q4. When the bus voltage becomes lower than the FC capacitor voltage, FC capacitor 110 begins to discharge current through body diodes of first switches Q1 and Q4. The body diodes of Q1 and Q4, however, are not designed to handle the high level short-circuit current. As a result, Q1 and Q4 may be damaged by the short-circuit current.

Figure 2:
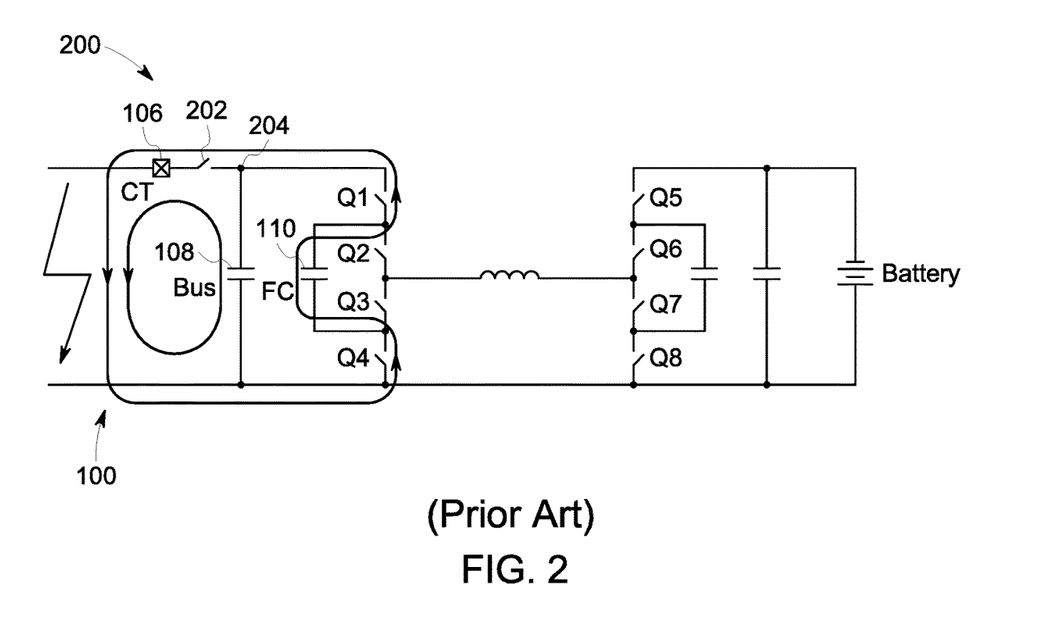
FIG. 2 is a schematic diagram of the converter shown in FIG. 1 including a short-circuit protection circuit known in the art.

FIG. 2 is a schematic diagram of a known converter system 200 and method of short-circuit protection for converter 100 shown in FIG. 1. Similar reference numerals are used to designate similar features. Converter system 200 includes a solid state circuit breaker (SSCB) 202 that is based on an insulated-gate bipolar transistor (IGBT) and electrically coupled in series between a bus terminal 204 and CT 106. SSCB 202 is tripped or turned off as shown in FIG. 2 when CT 106 or SSCB 202 itself detects that a short-circuit condition has occurred. As a result, energy sources such as bus capacitor 108 and FC capacitor 110 are isolated and converter system 200 is protected. This method suffers from two drawbacks. First, because SSCB 202 is active during normal operations of converter system 200, current passes through SSCB 202 and introduces a large conduction loss in SSCB 202. Second, the presence of SSCB 202, which is rated at the full power of the converter in the circuit, increases the cost of manufacturing converter system 200.

Figure 3:
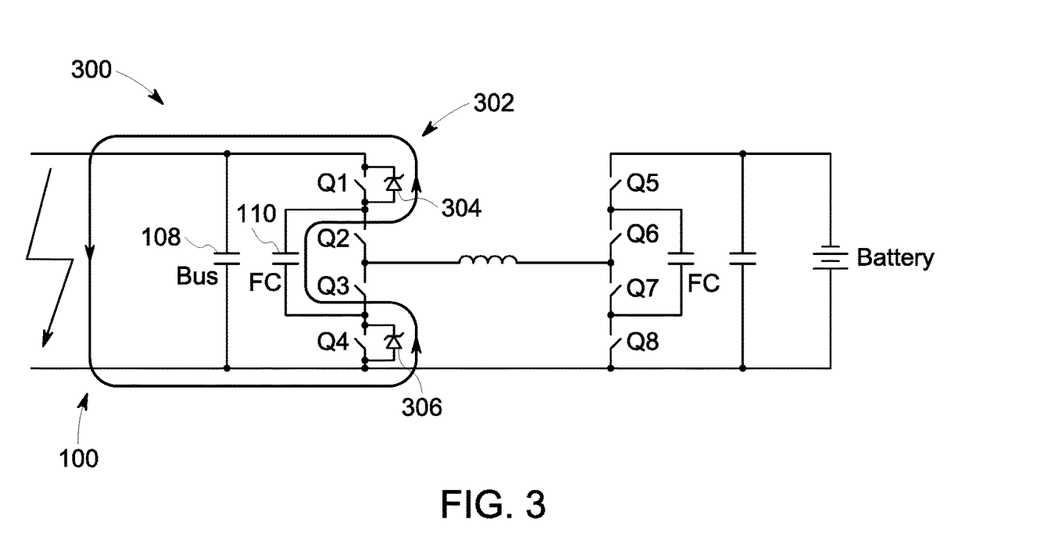
FIG. 3 is a schematic diagram of the converter shown in FIG. 1 including an exemplary short-circuit protection circuit.

FIG. 3 is a schematic diagram of an exemplary converter system 300 that includes an exemplary short-circuit protection circuit 302 and converter 100. In the exemplary embodiment, two Schottky diodes 304, 306 are electrically coupled in parallel with first switch Q1 and with first switch Q4, respectively. Schottky diodes 304, 306 may be silicon carbide (SiC) Schottky diodes. Because the forward voltage drop is lower in Schottky diodes 304, 306 than in body diodes of first switches Q1 and Q4, most of the short-circuit current flows through the Schottky diodes, instead of through body diodes of first switches Q1 and Q4 (shown in FIG. 3). Switches Q1 and Q4, therefore, are protected from the short-circuit current. Further, Schottky diodes 304, 306 have non-repetitive peak currents higher than the short-circuit current, and are capable of handling short-circuit currents. That is, Schottky diodes 304, 306 are not damaged when conducting the short-circuit current.

Figure 4:
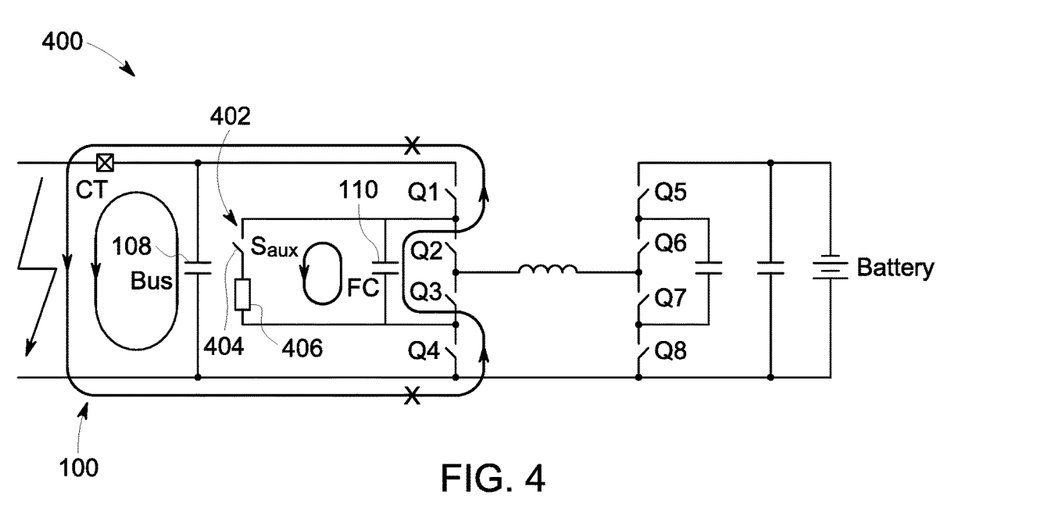
FIG. 4 is a schematic diagram of the converter shown in FIG. 1 including another exemplary short-circuit protection circuit.

FIG. 4 is a schematic diagram of an exemplary converter system 400 that includes another exemplary short-circuit protection circuit 402 for multilevel converter 100. In this embodiment, short circuit protection circuit 402 is an auxiliary circuit. Auxiliary circuit 402 is electrically coupled in parallel with FC capacitor 110. Auxiliary circuit 402 includes an auxiliary switch 404, for example an auxiliary transistor $S_{aux}$ 404, and a resistor 406. Under normal operating conditions, transistor $S_{aux}$ 404 of auxiliary circuit 402 is off, and no current passes through auxiliary circuit 402. Therefore, auxiliary circuit 402 does not impact the converter's normal operations. Under short-circuit conditions, however, auxiliary transistor $S_{aux}$ 404 is activated or turned on when current sensed by CT 106 is higher than a short-circuit protection threshold, and the absolute value of the difference between the voltage $V_{bus}$ across bus capacitor 108 and the voltage $V_{FC}$ across flying capacitor 110 is less than a predetermined threshold, e.g., 80% of the device breakdown voltage of first switches Q1 and Q4. Once auxiliary transistor $S_{aux}$ 404 is turned on, FC capacitor 110 discharges current to resistor 406 in auxiliary circuit 402. In the exemplary embodiment, resistor 406 is chosen such that it discharges quickly and such that voltage $V_{bus}$ is always larger than $V_{FC}$. In these conditions, the body diodes of first switches Q1 and Q4 are reverse biased and first switches Q1 and Q4 are protected from the short-circuit current as it does not flow through first switches Q1 and Q4. Because the discharge time of resistor 406 should be short, e.g., on the order of 10 s of μs, the resistance of resistor 406 should be small, and the peak current flowing through auxiliary transistor $S_{aux}$ 404 may be large.

Figure 5A:
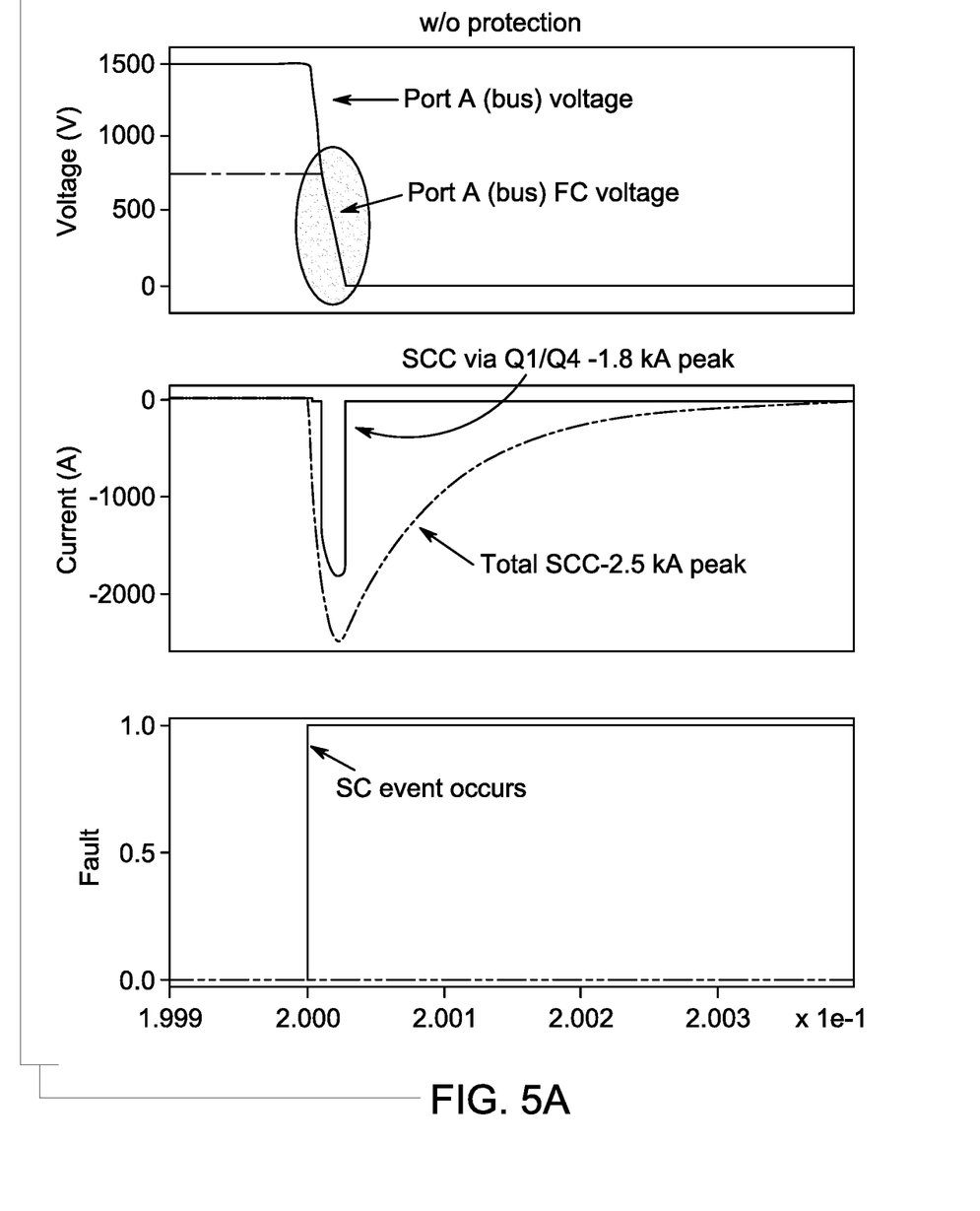
FIG. 5A is a graph demonstrating voltage, current, and fault onset curves of the converter shown in FIG. 1.
Figure 5B:
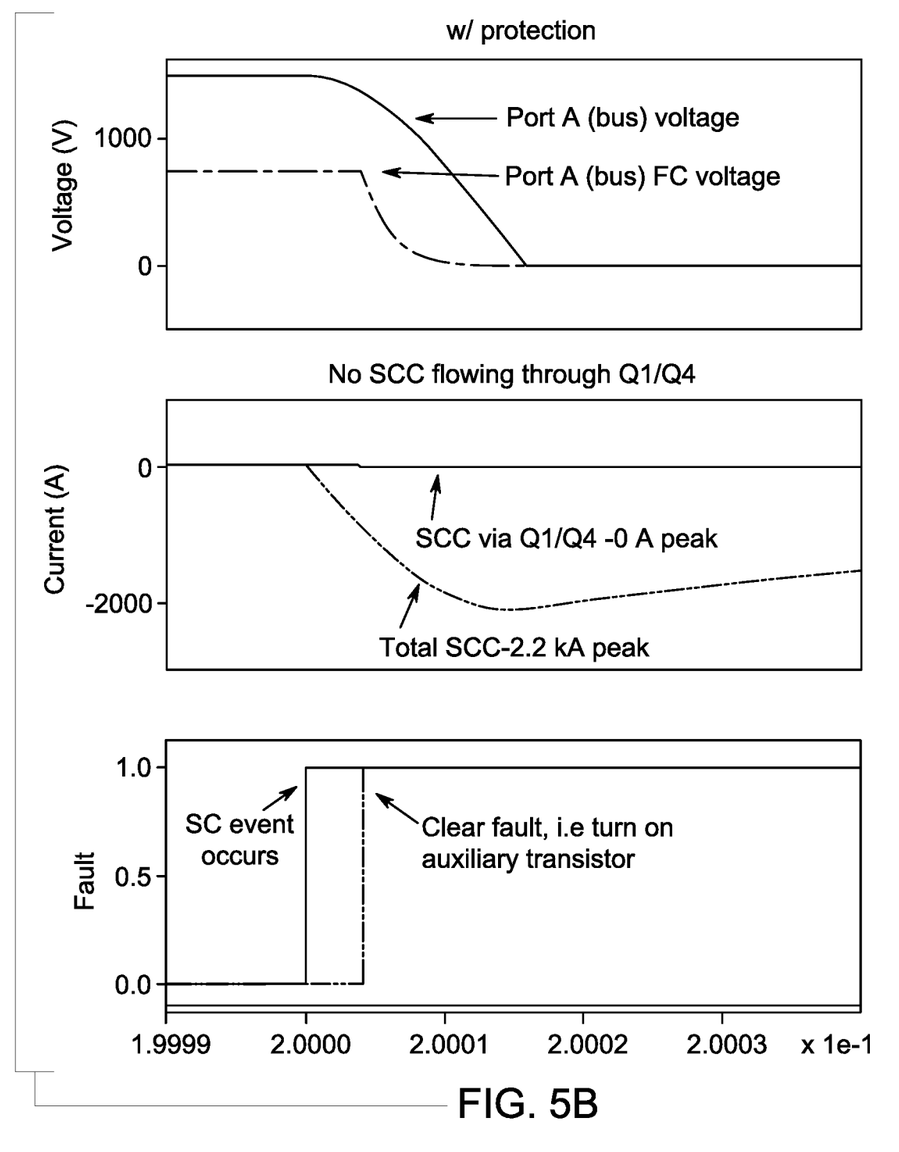
FIG. 5B is a graph demonstrating voltage, current, and fault onset curves of the converter shown in FIG. 1 with the short-circuit protection circuit as shown in FIG. 4.

FIGS. 5A and 5B show voltage, current, and fault onset curves from the terminals on the bus side. When a fault event, or short circuit (SC) event, occurs, without short-circuit protection, voltages $V_{bus}$ and $V_{FC}$ drop sharply and a large current passes through first switches Q1 and Q4 (shown in FIG. 5A). SCC used in the FIGS. 5A and 5B stands for short circuit current. In contrast, with a short-circuit protection circuit as shown in FIG. 4 included in the converter, voltage $V_{FC}$ decreases ahead of the dropping of $V_{bus}$ such that no current passes through first switches Q1 and Q4 during the onset of a short-circuit event. Accordingly, the short-circuit protection disclosed herein prevents damage to the converter.

Figure 6:
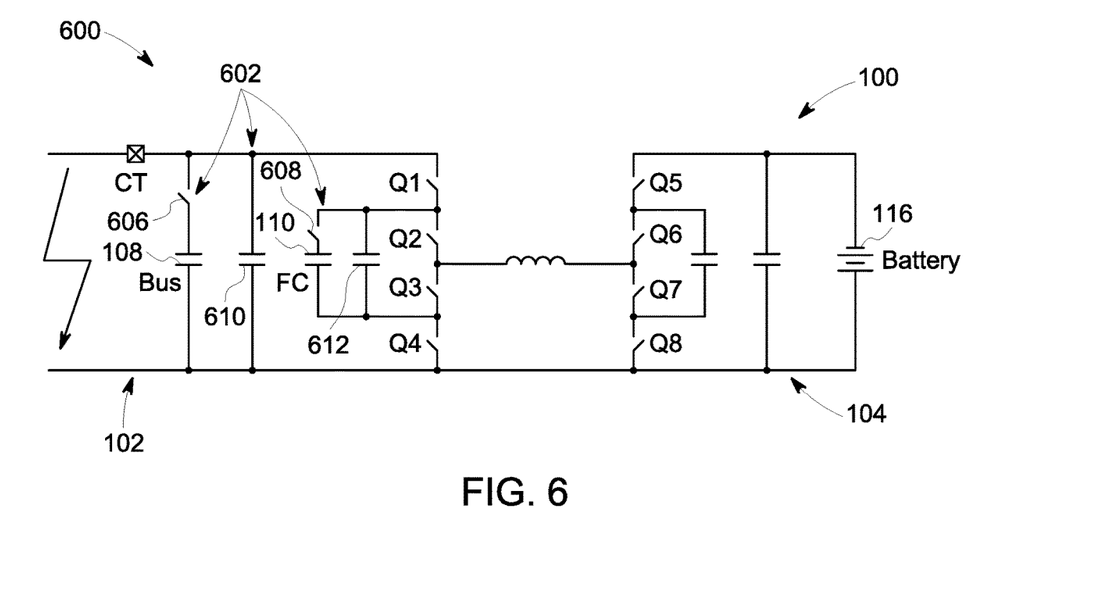
FIG. 6 is a schematic diagram of the converter shown in FIG. 1 including another exemplary short-circuit protection circuit.

FIG. 6 shows a converter system 600 that includes another exemplary short-circuit protection circuit 602 installed on bus side 102 of converter 100. In the exemplary embodiment, a first auxiliary switch 606, for example auxiliary transistor 606, is electrically coupled in series with the bus energy storage capacitor (bus capacitor 108), and a second auxiliary switch 608, for example auxiliary transistor 608, is electrically coupled in series with FC capacitor 110. Further, two decoupling capacitors 610, 612 are included in the converter, with one electrically coupled in parallel with bus capacitor 108 and the other electrically coupled in parallel with FC capacitor 110. In the exemplary embodiment, the capacitance of decoupling capacitors 610, 612 is approximately two orders of magnitude or more lower than the capacitance of bus capacitor 108 and FC capacitor 110. In one example, bus capacitor 108 has capacitance of 15 µF, FC capacitor 110 has capacitance of 20 µF, and decoupling capacitors 610, 612 have capacitance of 100 nF. When CT 106 detects a short-circuit event, two auxiliary transistors 606, 608 are turned off such that the energy stored in bus capacitor 108 and FC capacitor 110 is isolated from the short-circuit current loop. Instead, decoupling capacitors 610, 612 are in the short-circuit loop, but because of their much smaller capacitance, the currents discharged from decoupling capacitors 610, 612 are much smaller from those that would be discharged from the bus and FC capacitors 108, 110. Therefore, the first switches Q1 and Q4 are protected from a large, damaging short-circuit current during short-circuit conditions. Decoupling capacitors 610, 612 can also be used to reduce the switching loop parasitics to support fast switching of the switches during normal operation conditions. During normal operation, two auxiliary transistors 606, 608 are activated or turned on. The resulting insertion parasitic inductance can be compensated by decoupling capacitors 610, 612. Further, the power loss caused by the addition of auxiliary transistors 606, 608 is smaller than in known systems because only ripple currents of bus capacitor 108 and FC capacitor 110 flow through the auxiliary transistors 606, 608, instead of the much larger terminal output current.

Figure 7:
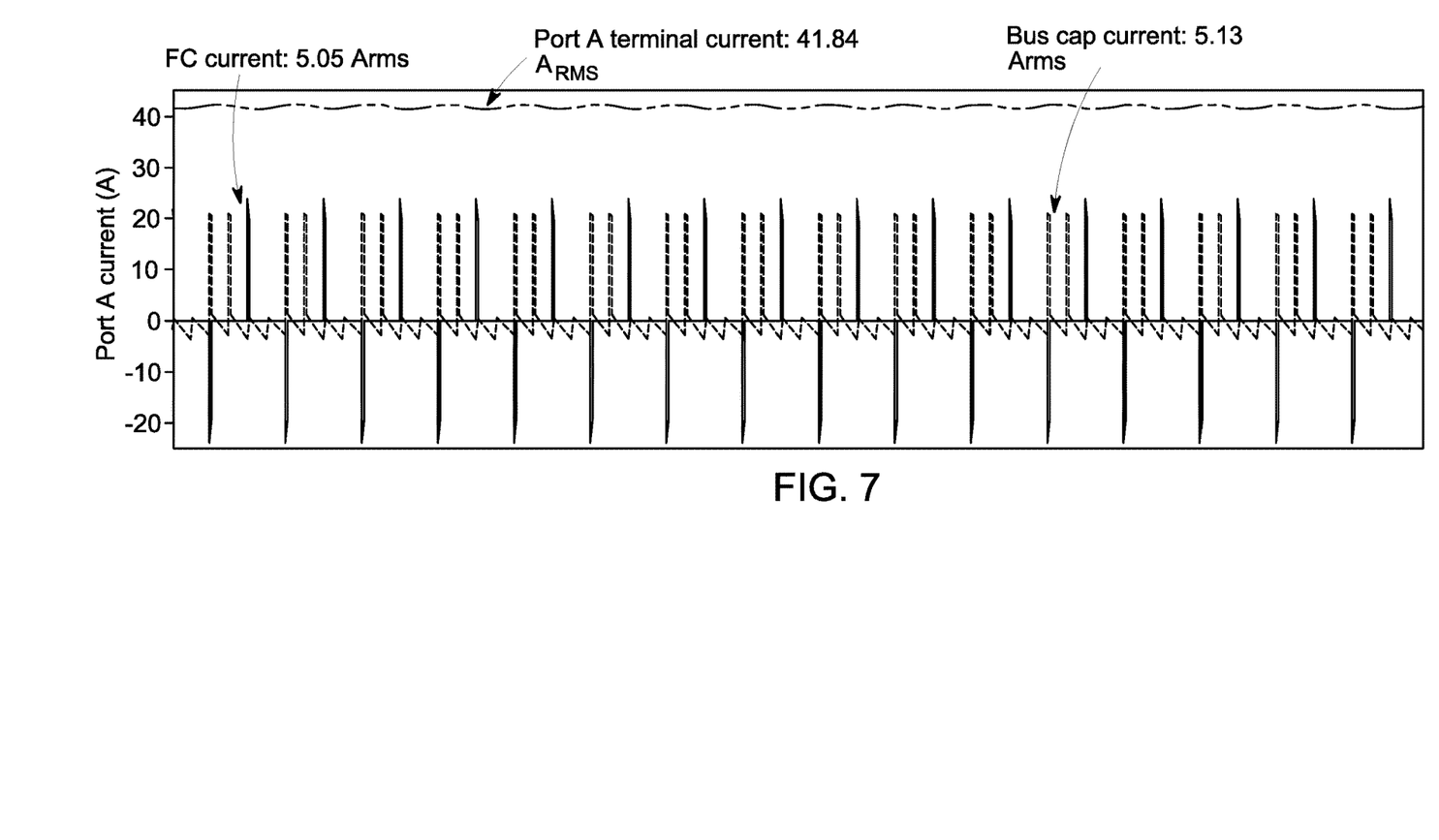
FIG. 7 is a graph demonstrating simulation results of currents on the bus side of the converter shown in FIG. 6.

FIG. 7 shows currents at the bus, FC, and port A (bus side 102) terminals of converter system 600 (shown in FIG. 6) derived in a simulation. In the simulation, the voltage on bus side 102 is 1500 V and the voltage across battery 116 on battery side 104 is 1450 V. The converter rate current is 44 Ampere (A). As shown in FIG. 7, the ripple currents caused by switching during normal operation flow to auxiliary transistors 606, 608 and the bus and FC capacitors 108, 110. The ripple currents, such as the FC and bus capacitor currents, are much smaller than the port A terminal current. For example, the root mean square value of the FC and bus capacitor currents are 5.05 A and 5.13 A, respectively, while the root-mean-square value of Port A terminal current is 41.84 A, which is much larger than the FC and bus capacitor currents.

Figure 8:
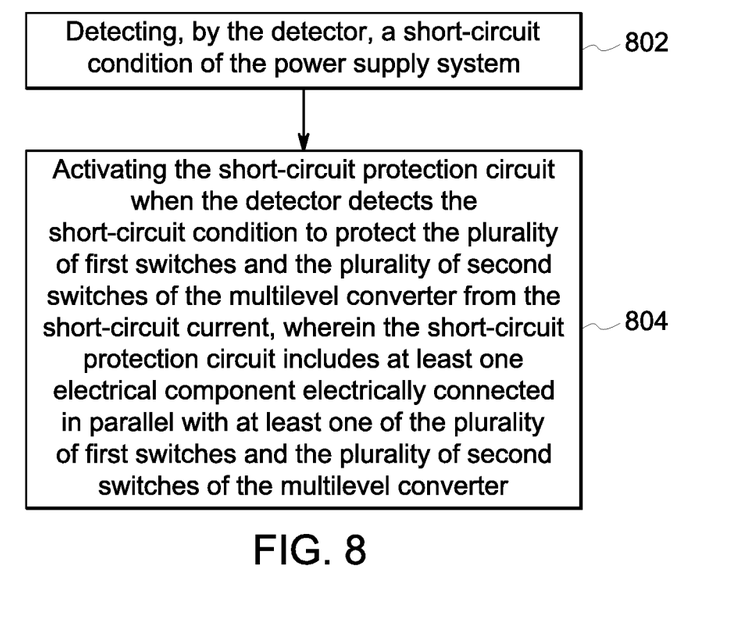
FIG. 8 is a flow chart illustrating an exemplary method of operating a power supply system.

FIG. 8 is a flow chart of an exemplary method 800 of operating a power supply system. The power supply system includes a multilevel converter and a detector of a short-circuit condition. The multilevel converter includes a first segment and a second segment electrically connected to the first segment, wherein the first and second segments are each configured to convert a first current to a second current. The first segment includes a plurality of first switches. The second segment includes a plurality of second switches. The multilevel converter further includes a bus terminal configured to supply electrical power to a load. The detector is electrically connected in series with the bus terminal of the multilevel converter. Method 800 includes detecting 802, by the detector, the short-circuit condition of the power supply system. Method 800 further includes activating 804 a short-circuit protection circuit when the detector detects the short-circuit condition to protect the plurality of first switches and the plurality of second switches from the short-circuit current. The short-circuit protection circuit includes at least one electrical component electrically connected in parallel with at least one of the plurality of first switches and the plurality of second switches.

The multilevel converter may include a bus capacitor and a flying capacitor. The short-circuit protection circuit may be configured to isolate energy stored in the bus capacitor and the flying capacitor to eliminate the short-circuit current during the short-circuit condition.

Exemplary embodiments of systems and methods including short-circuit protection circuits for multilevel converters are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

At least one technical effect of the systems and methods described herein includes (a) protecting the converter during short-circuit conditions; and (b) reducing power loss from the addition of a short-circuit protection circuit.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A multilevel converter system comprising:
    a multilevel converter comprising a first segment and a second segment electrically connected to said first segment, wherein said first and second segments are each configured to convert a first current to a second current, wherein said first segment comprises a plurality of first switches, and wherein said second segment comprises a plurality of second switches; and
    a short-circuit protection circuit electrically connected to said multilevel converter, wherein said short-circuit protection circuit comprises at least one electrical component that is electrically connected in parallel with at least one of said plurality of first switches and said plurality of second switches, wherein during a short-circuit condition, said plurality of first switches and said plurality of second switches are turned off, and said short-circuit protection circuit is configured to protect said plurality of first switches and said plurality of second switches from a short-circuit current during the short-circuit condition, and wherein said multilevel converter comprises a bus capacitor and a flying capacitor, and wherein said short-circuit protection circuit is configured to isolate energy stored in said bus capacitor and said flying capacitor to eliminate the short-circuit current during the short-circuit condition.

2. A multilevel converter system in accordance with claim 1, wherein said short-circuit protection circuit is configured to divert the short-circuit current to said short-circuit protection circuit such that the short-circuit current bypasses said plurality of first switches and said plurality of second switches, during the short-circuit condition.

3. A multilevel converter system in accordance with claim 1, wherein said multilevel converter comprises a flying capacitor electrically connected in series with said plurality of first switches and electrically connected in parallel with said plurality of second switches, wherein said at least one electrical component comprises a plurality of diodes each electrically connected in parallel with an associated one of said plurality of first switches, and wherein each of said plurality of diodes has a voltage drop less than that of a body diode of said associated one of said plurality of first switches.

4. A multilevel converter system in accordance with claim 3, wherein said plurality of diodes are Schottky diodes.

5. A multilevel converter system in accordance with claim 1, wherein said multilevel converter comprises a capacitor electrically connected in series with said plurality of first switches, and wherein said short-circuit protection circuit is configured to discharge energy stored in said capacitor to suppress the short-circuit current from flowing through said plurality of first switches, during the short-circuit condition.

6. A multilevel converter system in accordance with claim 1, wherein said multilevel converter comprises a bus capacitor electrically connected in parallel with said plurality of first switches and said plurality of second switches, wherein said multilevel converter further comprises a flying capacitor electrically connected in series with said plurality of first switches and electrically connected in parallel with said plurality of second switches, wherein said at least one electrical component comprises an auxiliary switch and a resistor, wherein said auxiliary switch and said resistor are electrically connected in parallel with said flying capacitor, wherein said auxiliary switch is turned on when the short-circuit condition is detected and an absolute value of a difference between a voltage across said bus capacitor and a voltage across said flying capacitor is less than a predetermined threshold, and wherein the predetermined threshold is less than a device breakdown voltage of said plurality of first switches.

7. A multilevel converter system in accordance with claim 6, wherein the resistor is sized to discharge energy stored in said flying capacitor such that said plurality of first switches remain reverse biased when said auxiliary switch is turned on.

8. A multilevel converter system in accordance with claim 1, wherein said multilevel converter comprises a bus capacitor and a flying capacitor, wherein said bus capacitor is electrically connected in parallel with said plurality of first switches and said plurality of second switches, wherein said flying capacitor is electrically connected in series with said plurality of first switches and electrically connected in parallel with said plurality of second switches, wherein said at least one electrical component comprises first and second decoupling capacitors and first and second auxiliary switches, wherein said first decoupling capacitor is electrically connected in parallel with said bus capacitor and has a capacitance approximately two orders of magnitude or more lower than a capacitance of said bus capacitor, wherein said second decoupling capacitor is electrically connected in parallel with said flying capacitor and has a capacitance approximately two orders of magnitude or more lower than a capacitance of said flying capacitor, wherein said first auxiliary switch is electrically connected in series with said bus capacitor, wherein said second auxiliary switch is electrically connected in series with said flying capacitor, and wherein said first and second auxiliary switches are turned off when the short-circuit condition is detected.

9. A short-circuit protection circuit for a multilevel converter, the multilevel converter including a first segment and a second segment electrically connected to the first segment, wherein the first and second segments are each configured to convert a first current to a second current, wherein the first segment includes a plurality of first switches, and wherein the second segment includes a plurality of second switches, said short-circuit protection circuit comprising:

at least one electrical component electrically connected in parallel with at least one of the plurality of first switches and the plurality of second switches of the multilevel converter, wherein during a short-circuit condition, the plurality of first switches and the plurality of second switches are turned off, and said short-circuit protection circuit is configured to protect the plurality of first switches and the plurality of second switches from a short-circuit current during the short-circuit condition, and wherein the multilevel converter includes a bus capacitor and a flying capacitor, and wherein said short-circuit protection circuit is configured to isolate energy stored in the bus capacitor and the flying capacitor to eliminate the short- circuit current during the short-circuit condition.

10. A short-circuit protection circuit in accordance with claim 9, wherein said short-circuit protection circuit is configured to divert the short-circuit current to said short-circuit protection circuit such that the short-circuit current bypasses the plurality of first switches and the plurality of second switches, during the short-circuit condition.

11. A short-circuit protection circuit in accordance with claim 9, wherein the multilevel converter includes a flying capacitor electrically connected in series with the plurality of first switches and electrically connected in parallel with the plurality of second switches, wherein said at least one electrical component comprises a plurality of diodes each electrically connected in parallel with an associated one of the plurality of first switches, and wherein each of said plurality of diodes has a voltage drop less than that of a body diode of the associated one of the plurality of first switches.

12. A short-circuit protection circuit in accordance with claim 11, wherein said plurality of diodes are Schottky diodes.

13. A short-circuit protection circuit in accordance with claim 9, wherein the multilevel converter includes a capacitor electrically connected in series with the plurality of first switches, and wherein said short-circuit protection circuit is configured to discharge energy stored in the capacitor to suppress the short-circuit current from flowing through the plurality of first switches, during the short-circuit condition.

14. A short-circuit protection circuit in accordance with claim 9, wherein the multilevel converter includes a bus capacitor electrically connected in parallel with the plurality of first switches and the plurality of second switches, wherein the multilevel converter further includes a flying capacitor electrically connected in series with the plurality of first switches and electrically connected in parallel with the plurality of second switches, wherein said at least one electrical component comprises an auxiliary switch and a resistor, wherein said auxiliary switch and said resistor are electrically connected in parallel with the flying capacitor, wherein said auxiliary switch is turned on when the short-circuit condition is detected and an absolute value of a difference between a voltage across the bus capacitor and a voltage across the flying capacitor is less than a predetermined threshold, and wherein the predetermined threshold is less than a device breakdown voltage of said plurality of first switches.

15. A short-circuit protection circuit in accordance with claim 14, wherein the resistor is sized to discharge energy stored in the flying capacitor such that the plurality of first switches remain reverse biased when said auxiliary switch is turned on.

16. A short-circuit protection circuit in accordance with claim 9, wherein the multilevel converter includes a bus capacitor and a flying capacitor, wherein the bus capacitor is electrically connected in parallel with the plurality of first switches and the plurality of second switches, wherein the flying capacitor is electrically connected in series with the plurality of first switches and electrically connected in parallel with the plurality of second switches, wherein said at least one electrical component comprises first and second decoupling capacitors and first and second auxiliary switches, wherein said first decoupling capacitor is electrically connected in parallel with the bus capacitor and has a capacitance approximately two orders of magnitude or more lower than a capacitance of the bus capacitor, wherein said second decoupling capacitor is electrically connected in parallel with the flying capacitor and has a capacitance approximately two orders of magnitude or more lower than a capacitance of the flying capacitor, wherein said first auxiliary switch is electrically connected in series with the bus capacitor, wherein said second auxiliary switch is electrically connected in series with the flying capacitor, and wherein said first and second auxiliary switches are turned off when the short-circuit condition is detected.

17. A multilevel converter system comprising:
a multilevel converter comprising a first segment and a second segment electrically connected to said first segment, wherein said first and second segments are each configured to convert a first current to a second current, wherein said first segment comprises a plurality of first switches, wherein said second segment comprises a plurality of second switches, wherein said multilevel converter further comprises a bus capacitor and a flying capacitor, wherein said bus capacitor is electrically connected in parallel with said plurality of first switches and said plurality of second switches, and wherein said flying capacitor is electrically connected in series with said plurality of first switches and in parallel with said plurality of second switches; and
a short-circuit protection circuit electrically connected to said multilevel converter, wherein said short-circuit protection circuit comprises at least one electrical component that is electrically connected in parallel with at least one of said plurality of first switches and said plurality of second switches,
wherein during a short-circuit condition, said plurality of first switches and said plurality of second switches are turned off, and said short-circuit protection circuit is configured to protect said plurality of first switches and said plurality of second switches from a short-circuit current during the short-circuit condition, and
wherein said short-circuit protection circuit is configured to isolate energy stored in said bus capacitor and said flying capacitor to eliminate the short-circuit current during the short-circuit condition.

\* \* \* \* \*